(12) United States Patent
Harriman et al.

(10) Patent No.: US 6,674,260 B1
(45) Date of Patent: Jan. 6, 2004

(54) DC MOTOR CONTROL

(75) Inventors: Douglas L. Harriman, Portland, OR (US); Robert D. Davis, Brush Prairie, WA (US); Robert P. Callaway, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/175,711

(22) Filed: Jun. 20, 2002

(51) Int. Cl.[7] ............................................. G05B 11/28
(52) U.S. Cl. ....................... 318/599; 388/804; 388/934; 318/560; 318/600
(58) Field of Search ................................ 318/599, 560, 318/600, 567, 434, 811, 471; 388/804, 934

(56) References Cited

U.S. PATENT DOCUMENTS

| | | | | |
|---|---|---|---|---|
| 5,617,122 A | * | 4/1997 | Numata et al. ................ | 347/14 |
| 5,934,398 A | * | 8/1999 | Hotta ......................... | 180/65.8 |
| 5,977,737 A | * | 11/1999 | Labriola, II .................. | 318/599 |
| 6,019,448 A | * | 2/2000 | Yano et al. ................... | 347/12 |
| 6,446,745 B1 | * | 9/2002 | Lee et al. .................... | 180/206 |

* cited by examiner

Primary Examiner—Karen Masih

(57) ABSTRACT

A method of controlling a DC motor is presented. In a tracking action, an input to the motor is tracked. In a comparing action, the input is compared against a baseline value. In an adjusting action, a usage of the motor is adjusted when the input passes a threshold related to a motor performance parameter. A method of estimating a parameter of an ink carriage moved by a DC motor is also presented. In a tracking step, an input to the motor is tracked. In a comparing action, the input is compared against a baseline value to predict a level of the parameter.

25 Claims, 4 Drawing Sheets

DC MOTOR CONTROL

Direct current (DC) motors are able to produce torque because a current-carrying conductor located in a magnetic field experiences a force proportional to the magnitude of the flux, the current, the length of the conductor, and the sine of the angle between the conductor and the direction of the flux. When the conductor is a fixed distance (radius) from an axis about which it can rotate, a torque is produced that is proportional to the product of the force and the radius. In a DC motor, the resultant torque is the sum of the torques produced by each conductor. Each of the conductors are known as windings, and it is important for the windings to be insulated from each other so that the current flowing through them will not short circuit from one winding to another.

DC motors should be designed so that they will not overheat during usage. If the windings on a DC motor reach a temperature at which the protective coating, or insulation on the conductors melts, then the motor may short-circuit and fail. In addition to ambient conditions, things which affect the temperature of a DC motor can include the design and size of the DC motor, the magnitude of the load which the DC motor is coupled to, or even changes to the efficiency of the DC motor over time. If the temperature of a DC motor cannot be measured while the DC motor is in use, then the DC motor must be designed or selected robust enough to handle the worst-case loads it can possibly see over the expected lifetime of the DC motor. Often, this means a relatively large DC motor must be selected. Using such a large DC motor may add significant cost to a product containing the DC motor.

DETAILED DESCRIPTION OF THE PREFERRED EMBODIMENTS

Figure 1:
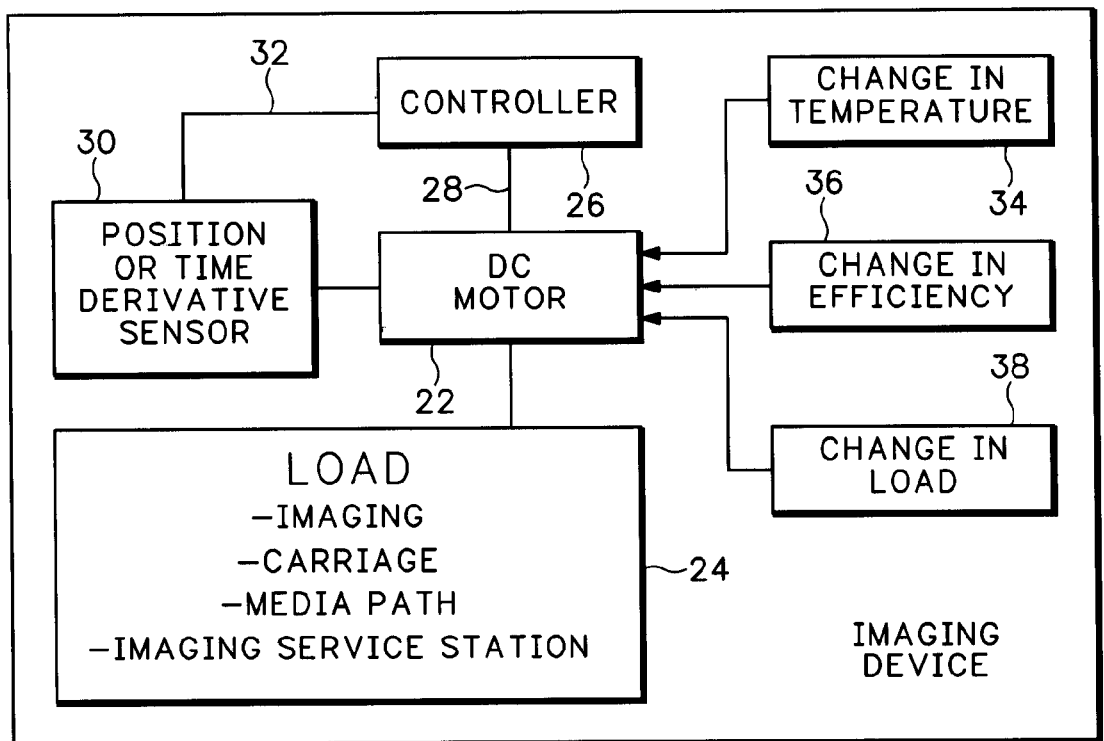
FIG. 1 schematically illustrates one embodiment of an imaging device with a DC motor.

FIG. 1 schematically illustrates one embodiment of an imaging device 20 having at least one DC motor 22. A variety of imaging devices are commercially available. For instance, some of the imaging devices that may embody the concepts described herein include desk top printers, portable printing units, wide-format printers, hybrid electrophotographic-inkjet printers, copiers, cameras, video printers, and facsimile machines, to name a few. The concepts introduced herein need not be limited to the environment of an imaging device, and can be applied to other devices having DC motors. However, for convenience the concepts introduced herein are described in the environment of an imaging device 20.

The DC motor 22 is coupled to a load 24. Since the embodiment of FIG. 1 is an imaging device 20, the load 24 could be an imaging load, such as a photoreceptor belt, a toner sump, or a fuser roller, for example. The load 24 could be a carriage designed to hold ink cartridges for movement back and forth across a printzone while imaging. The load 24 could be a paper-path which transports an imaging media throughout the imaging device 20. The load 24 could also be some type of imaging service station, such as a capping and wiping system in an inkjet device, or an electrostatic brush cleaner in an electrophotographic system. The load 24 can be anything driven, moved, or activated by the torque produced from the DC motor 22. The coupling of the load 24 to the motor 22 may be accomplished directly, or by way of linking elements such as gears, pulleys, clutches, belts, friction rollers, or any combination thereof. Such linking elements are well known to those skilled in the art.

The motor 22 may be coupled to a controller 26. The controller 26 may be a computer, a microprocessor, an application specific integrated circuit (ASIC), digital components, analog components, or any combination thereof. The controller 26 provides an input 28 to the DC motor 22. A DC motor can have at least two possible inputs. In one instance, the magnetic flux may be varied, and in another instance, the current in the windings, or armature current may be varied. Thus, there are two common modes of operation for a DC motor: 1) armature control, where an adjustable voltage or current is applied to the armature or windings while the magnetic flux is held constant. In this case, the magnetic flux may be held constant by maintaining a constant magnetic field current or by using a fixed magnet. 2) Field control, where an adjustable voltage or current is applied to create a magnetic field which may be varied, while the armature current is held constant.

Regardless of what mode of DC motor operation is selected, a technique referred to as pulse width modulation (PWM) may be employed to vary the effective voltage or current seen by the armature or by the field. PWM controls the motor 22 with short pulses of voltage or current. These pulses are varied in duration to change the speed of the motor. The longer the pulses, the more torque the motor can produce and visa versa. For example, if the output of a DC voltage source is twelve volts, and the PWM signal is on 25%, 50%, or 75% of the time, the motor would receive the approximate average of three, six, and nine volts, respectively.

PWM is a way of digitally encoding analog signal levels. Through the use of high-resolution counters, the duty-cycle of a square wave is modulated to encode a specific analog signal level. The PWM signal is still digital, however, because at any given instant in time, the full DC supply is either fully on or fully off. Most motors require high PWM frequencies. The PWM period should be short relative to the motor's response time to a change in the switched signal state. Common PWM frequencies may range from 1 kHz to 200 kHz, for example. The duty cycle is the ratio of the on-time in a given period to the period.

For the sake of explanation, the following discussions will refer to the motor 22 in FIG. 1 as being controlled in armature control mode, with a fixed magnetic flux, using PWM from the controller 26 as the input 28 to the motor 22's windings. It should be understood that PWM could be applied to the magnetic field current instead.

A position or time derivative sensor 30, such as an encoder, may be coupled between the motor 22 and the controller 26. The position or time derivative sensor 30 provides positional, velocity, or acceleration feedback 32 to the controller 26. Based on the feedback 32, the controller 26 may adjust the input 28 to the motor 22, in this case adjust the PWM to the motor 22, in order to result in a desired positional move, motor speed, or motor acceleration.

Various factors may affect the DC motor's 22 ability to respond to the motor input 28 in order to move the load 24. An increase in temperature 34, which is seen in the motor windings, can cause the resistance to increase, since copper has a positive temperature coefficient with respect to resistance. Also, magnets have a negative temperature coefficient with respect to flux, so the magnetic field will become weaker as the temperature increases. As a result, the change in temperature 34 can affect the motor's efficiency. Any change in the motor's efficiency 36 can change the DC motor's 22 response to the controller's input 28 with regard to the motor's ability to move or actuate the load 24. The load 24 may also change 38. For example, if the load 24 is a carriage which holds ink cartridges, as the ink cartridges are emptied through printing, the load 24 will have less mass, and therefore will reduce the load. On the other hand, the load 24 may increase, due to increased friction from aging or dirty parts. There are any of a number of reasons why there could be a change in load 38, but a change in load 38 may also affect the ability of the DC motor 22 to respond to the motor input 28 in order to move the load.

Figure 2:
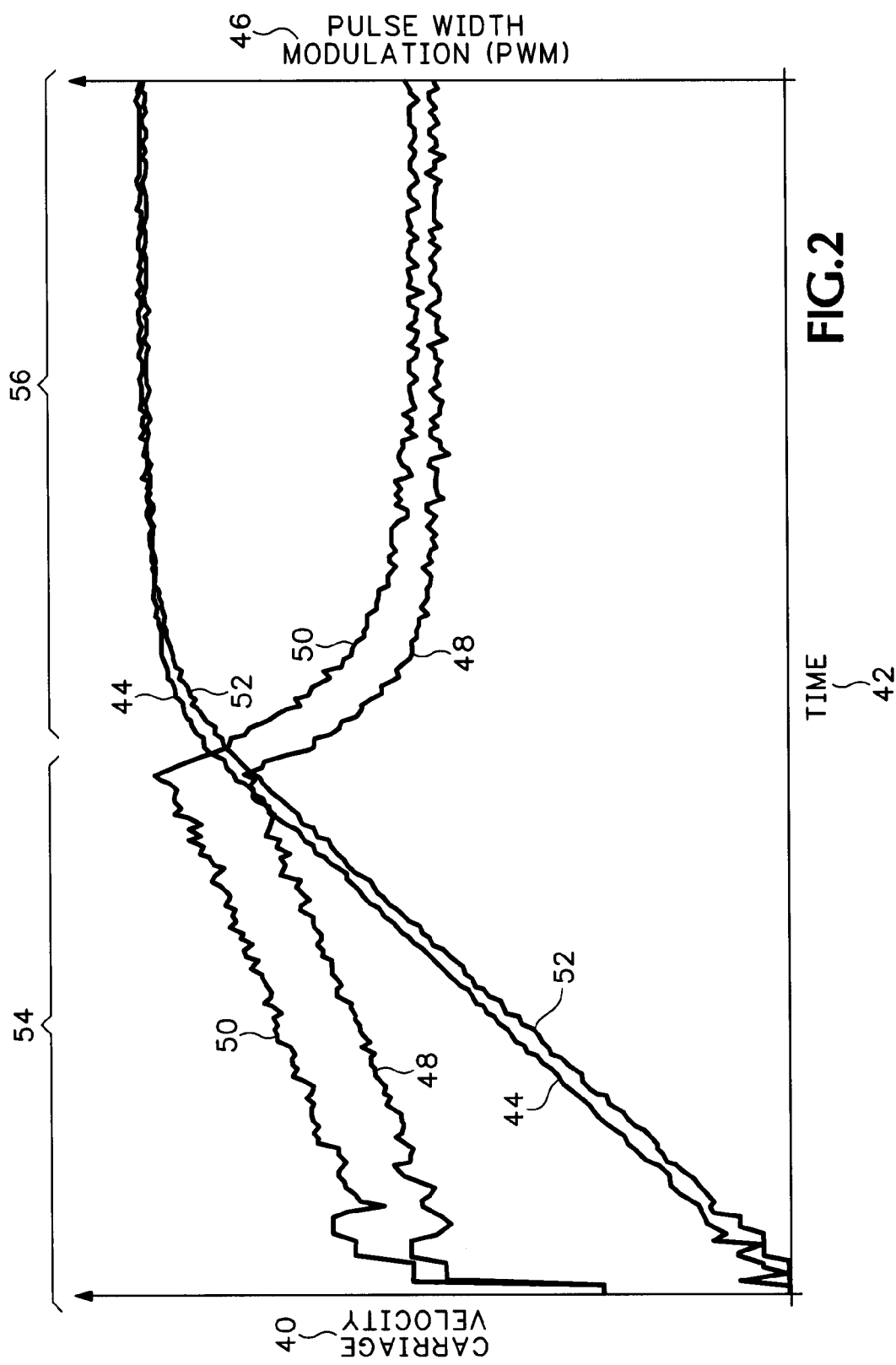
FIG. 2 illustrates one embodiment of pulse-width-modulation (PWM) curves and corresponding load velocity curves over time.

FIG. 2 illustrates one embodiment of pulse-width-modulation (PWM) curves and corresponding load velocity curves over time. The embodiment of FIG. 2 is for a carriage being moved by a DC motor 22. The carriage is for the transport of one or more ink cartridges. The carriage velocity 40 is shown on the left vertical axis. Time 42 is depicted along the horizontal axis. The carriage velocity 40 is measured by the controller 26 through the use of feedback 32 taken from a position or time derivative sensor 30. Cold velocity curve 44 illustrates a velocity achieved versus time when the motor 22 is relatively cold. Based on the feedback 32 from the position or time derivative sensor 30, the controller 26 adjusts the motor input 28, in this case adjusts the PWM, to achieve the desired carriage velocity 40 at a given moment in time 42. The PWM 46 is shown on the right vertical axis. Cold PWM curve 48 illustrates the PWM 46 values over time 42 used to result in the cold velocity curve 44 in this embodiment. At some point, the load could change 38, for example, the load 24 may have more frictional resistance due to age or use. The motor efficiency could change 38, for example, the bearings inside the motor could become aged or dirty. The temperature in the motor can also change 34, simply through extended use of the motor. When the temperature of the windings increases, the resistance of the windings also increases. Thus, a change in load, efficiency, or temperature may require a larger or smaller input from the controller to maintain the same velocity. Warm PWM curve 50 illustrates the PWM 46 values over time 42 used to result in a warm velocity curve 52 in this embodiment. The start of the cold PWM curve 48 and the start of the warm PWM curve 50 are aligned in time 42 so that the two curves can be compared. Similarly, the start of the cold velocity curve 44 and the start of the warm velocity curve 52 are aligned in time 42 so that those two curves can be compared. As can be seen for this embodiment, in order to achieve a similar velocity under warmer conditions, the warmer PWM 50 must be significantly higher than the colder PWM 48. In this embodiment, the difference between the warm PWM curve 50 and the cold PWM curve 48 is greatest during an acceleration phase 54 of the velocity curves 44, 52. A substantially constant velocity phase 56 can also be seen on both the warm PWM curve 50 and the cold PWM curve 48. In this embodiment, the difference between the warm PWM curve 50 and the cold PWM curve 48, during the substantially constant velocity phase 56 is relatively small. This is indicative that the embodied system is an inertia dominated system. On the other hand, there are also systems which can be velocity or friction dominated. In these systems, the difference between the warm PWM curve 50 and the cold PWM curve 48 might be larger than illustrated for the embodiment of FIG. 2 during the substantially constant velocity phase 56.

The position or time derivative sensor 30 allows the controller to adjust the DC motor input 28, in this case, the PWM, so that a desired move, velocity, or acceleration is obtained by the load 24 coupled to the motor. Depending on the load 24 itself, or changes in temperature 34, changes in motor efficiency 36, and/or changes in load 38, the controller 26 may be in a position where it has to increase the DC motor input 28 to the point where the increased input to compensate for changes in load, temperature, or efficiency can cause the temperature of the motor windings to increase to the point where the insulation on the motor windings melts, and one or more of the windings short circuit. As a result of the short circuit, the motor 22 can get weak, or stop, or stall. To avoid this situation, a large motor is often selected to take into account the worst case loads, temperatures, and changes in efficiency that the motor could be expected to see. Along with the margin against motor failure that a larger motor provides, it is often more expensive and the additional size is often undesirable when compared to a smaller motor.

Figure 3:
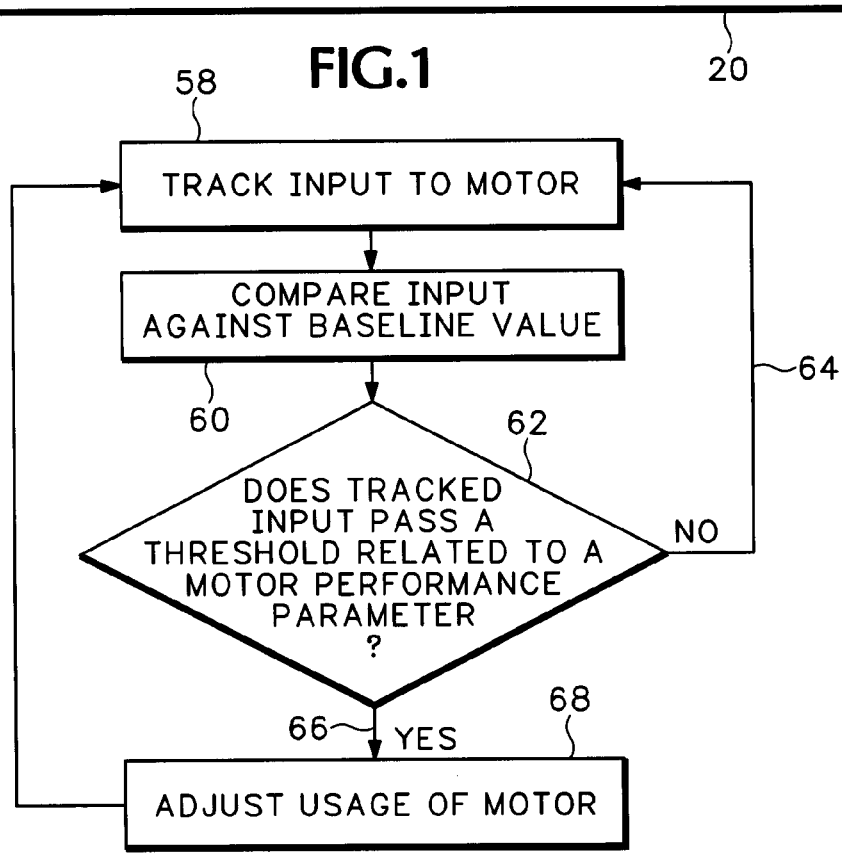
FIGS. 3, 4A, and 4B illustrate embodiments of actions which may adjust usage of a DC motor based on an input to the DC motor.

FIG. 3 illustrates one embodiment of actions which may adjust the usage of a DC motor based on an input to the DC motor. The input to the motor is tracked 58, and compared 60 against a baseline value. In comparing 60 against a baseline value, the controller determines 62 whether or not the tracked input passes a threshold related to a motor performance parameter. Examples of motor performance parameters include motor winding temperature, efficiency of the motor, age of the motor, and characteristics of the load coupled to the motor. Characteristics of the load may include mass of the load and friction or mechanical resistance of the load. In an imaging device, the characteristics of the load could be a quantity of ink cartridges being carried by a carriage moved by the DC motor. A characteristic of the load could also be an amount of ink in an ink cartridge. If there are fewer cartridges or less ink, then the motor usage may be adjusted by increasing the input to the motor as compared to the input levels when there are more cartridges or more ink because the motor would be less likely to overheat with a smaller load. If a threshold is not passed, the controller continues to track 58 input to the motor. If a threshold is passed 66, then input to the motor is adjusted 68. Thus, the controller 26 is able to control the DC motor 22 not only with regard to position, velocity, and/or acceleration, but also to indirectly monitor motor performance parameters such as temperature, age of the motor, motor efficiency, mass of the load (related to number of ink cartridges and amount of ink) and adjust the usage of the motor (increase or decrease) when necessary without needing a temperature sensor or other sensor.

Figure 4A:
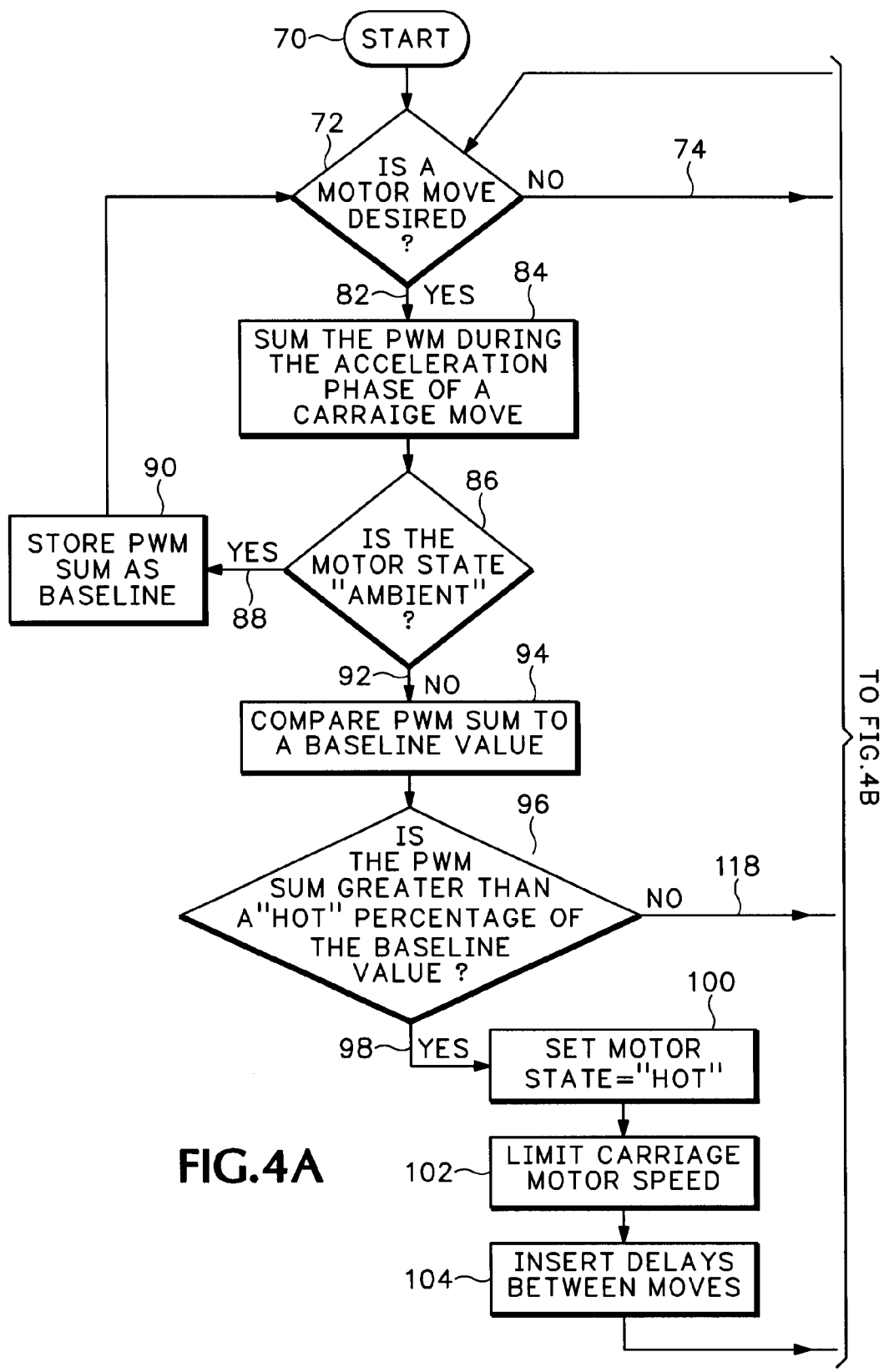
Figure 4B:
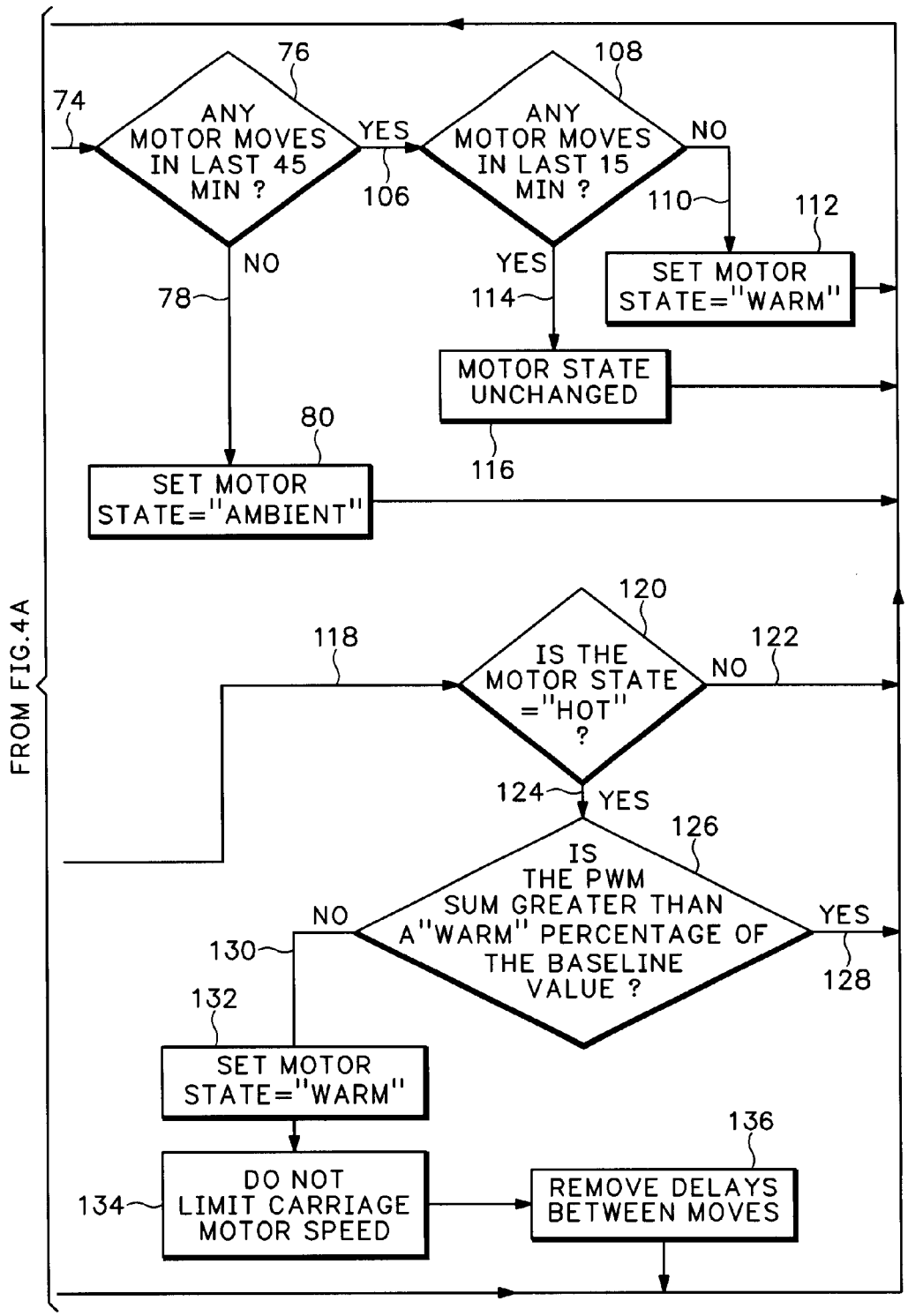

FIGS. 4A and 4B illustrate one embodiment of actions which may adjust the usage of a DC motor based on a previous input to the DC motor in the environment of an imaging device 20. The imaging device 20 has a carriage coupled to the DC motor for carrying ink cartridges. The actions illustrated in FIGS. 4A and 4B start with an arbitrary starting point 70. The controller 26 decides 72 whether or not a motor move is desired. If no move is desired 74, the controller determines 76 whether there have been any motor moves within the last forty-five minutes. If there have been no moves within the last forty-five minutes 78, the motor state is set 80 to "ambient". While forty-five minutes may be appropriate in this embodiment, other time periods may be determined to be appropriate for other embodiments. For example, if a motor is known to be at an ambient temperature after a shorter or a longer time, then that time period may be used instead. The controller 26 then decides 72 again whether or not a motor move is desired. If a motor move is desired the PWM is summed 84 during an acceleration phase of a carriage move. In a velocity or friction dominated system, it may be more desirable to sum the PWM after the acceleration phase. Other mathematical values based on the PWM could be used instead of the sum, for example, an average PWM value, or a peak PWM value could be used. For simplicity, however, only a sum of PWM values 84 during the acceleration phase of a carriage move is described. The controller determines 86 whether or not the motor state is ambient. The motor state in this case refers to temperature of the motor. If the motor state is ambient 88, the PWM sum is stored 90 as a baseline value, and the controller 26 decides 72 again whether or not a motor move is desired.

After determining 86 whether the motor state is ambient, if the motor state is not ambient 92, the PWM sum is compared 94 to a baseline value. The controller 26 determines 96 whether the PWM sum is greater than a "hot" percentage of the baseline value. For example, it may be desirable to set the hot percentage at 115% of the baseline value. Other hot percentages can be determined empirically based on the size of the motor being used and the load it is driving. If the PWM sum is greater 98 than the hot percentage of the baseline value the motor state is set 100 to "hot", the carriage motor speed is limited 102, and delays are inserted 104 between carriage moves. In other embodiments, it may be desirable to only limit the carriage speed 102, or only insert delays between moves 104, rather than do both. Adjusting motor speed and inserting or removing delays between motor moves are examples of ways to adjust the motor usage. If the PWM is being tracked for a motor performance parameter like mass of the load, then it could be desirable to adjust the motor usage by increasing the motor speed or removing delays. In the case of increased temperature, however, it may instead be desirable to limit the carriage speed 102 and/or insert delays between moves 104. The carriage speed may be limited by decreasing the PWM values sent to the motor, or placing a maximum limit on the PWM values. By limiting the speed and/or placing delays between moves, the motor can be operated safely within a temperature range which will not allow the winding insulation to melt and the windings to short circuit. After limiting the carriage motor speed 102 and inserting delays between motor moves 104, the controller can again determine 72 whether a motor move is desired.

If a motor move is not desired 74, and if there have been motor moves within the last forty-five minutes 106, the controller determines 108 whether there have been any motor moves within the last fifteen minutes. If there have not been any motor moves in the last fifteen minutes 110, then the motor state is set 112 to "warm". On the other hand, if there have been motor moves in the last fifteen minutes 114, the motor state remains unchanged 116. The controller can then again determine 72 whether a motor move is desired. In this embodiment, fifteen minutes is used as part of the decision point 108 to determine whether to set the motor state to warm 112, or leave it unchanged 116. Other time periods greater than or less than fifteen minutes may be used. It is recommended that the time period in the comparison of block 108 be less than the time period used in the preceding comparison of block 76. This is because it should take a longer time to reach "ambient" than it takes to reach "warm" while the motor is cooling.

Referring back to the decision block 96, if the PWM sum is not greater 118 than a predetermined hot percentage, then the controller examines 120 whether the motor state is "hot". If the motor state is not hot 122, then the controller can again determine 72 if a motor move is desired. If the motor state is hot 124, the controller 26 determines 126 whether the PWM sum is greater than a "warm" percentage of the baseline value. For example, it may be desirable to set the warm percentage at 108% of the baseline value. Other warm percentages can be used, but the warm percentage should be less than the hot percentage. If the PWM sum is greater than 128 the warm percentage of the baseline value, nothing happens, the motor state remains "hot", and the controller can again determine 72 if a motor move is desired. If the PWM sum is not greater than 130 the warm percentage of the baseline value, then the motor state is set to warm 132, the carriage motor speed is no longer limited 134, and the delays between carriage moves are removed 136.

In discussing various embodiments of DC motor control methods, various benefits have been noted above. It is apparent that a variety of other functionally equivalent modifications and substitutions may be made to implement an embodiment of DC motor control according to the concepts covered herein, depending upon the particular implementation, while still falling within the scope of the claims below.

We claim:

1. A method of controlling a DC motor, comprising:
    tracking an input to the motor;
    comparing the input against a baseline value; and
    adjusting a usage of the motor when the input passes a threshold related to a motor performance parameter.

2. The method of claim 1, wherein the motor performance parameter is motor temperature.

3. The method of claim 1, wherein the motor performance parameter is selected from the group consisting of motor efficiency, motor age, and a characteristic of a load coupled to the DC motor.

4. The method of claim 3, wherein:
    the load comprises a carriage for the carrying of at least one ink cartridge; and
    the characteristic of the load driven by the DC motor is selected from the group consisting of an amount of ink and a quantity of ink cartridges present on the carriage.

5. The method of claim 1, wherein adjusting the usage of the motor comprises limiting the input to the motor.

6. The method of claim 1, wherein adjusting the usage of the motor comprises adding delays between motor moves.

7. The method of claim 1, wherein adjusting the usage of the motor comprises increasing the input to the motor.

8. The method of claim 1, wherein the input to the motor is a pulse width modulation (PWM).

9. The method of claim 8, wherein tracking the PWM to the motor comprises summing the PWM over a period of time comprising an acceleration phase of the motor.

10. The method of claim 8, wherein tracking the PWM to the motor comprises summing the PWM over a period of time comprising a substantially constant velocity phase of the motor.

11. The method of claim 8, wherein tracking the PWM to the motor comprises looking for a peak PWM value.

12. The method of claim 8, wherein tracking the PWM to the motor comprises averaging PWM values.

13. A method of controlling a DC motor, comprising:
    tracking a PWM during a motor move;
    storing the tracked PWM as a baseline value if the motor is at an ambient state;

comparing the tracked PWM to the baseline value if the motor is not at the ambient state;

if the tracked PWM is greater than a hot percentage of the baseline value:
  determining that the motor is in a hot state; and
  limiting a usage of the motor; and if the tracked PWM is not greater than a hot percentage of the baseline value, and if the motor is in a hot state, and if the tracked PWM is not greater than a warm percentage of the baseline value:
  determining that the motor is in a warm state; and
  not limiting the usage of the motor.

14. The method of claim 13, wherein:

limiting the usage of the motor comprises limiting the speed of the motor; and not limiting the usage of the motor comprises not limiting the speed of the motor.

15. The method of claim 13, wherein:

limiting the usage of the motor comprises adding delays between motor moves; and not limiting the usage of the motor comprises removing delays between motor moves.

16. The method of claim 13, wherein tracking the PWM comprises summing the PWM over a period of time comprising an acceleration phase of the motor.

17. The method of claim 13, wherein tracking the PWM comprises summing the PWM over a period of time comprising a substantially constant velocity phase of the motor.

18. The method of claim 13, further comprising:

if no motor moves have been made within a first time period, determining that the motor is in the ambient state; and if motor moves have been made within the first time period, and if no motor moves have been made within a second time period, the second time period being less than the first time period, determining that the motor is in the warm state.

19. A method of estimating a parameter of an ink carriage moved by a DC motor, comprising:

tracking an input to the motor;

comparing the input against a baseline value to predict a level of the parameter.

20. The method of claim 19, wherein the parameter comprises an ink level of an ink cartridge carried by the ink carriage.

21. The method of claim 19, wherein the parameter comprises an age of the motor.

22. The method of claim 19, wherein the parameter comprises an efficiency of the motor.

23. The method of claim 19, wherein the parameter comprises a quantity of ink cartridges carried by the ink carriage.

24. An imaging device, comprising:

a direct current motor; and means for adjusting a usage of the motor based on a tracked input to the motor.

25. The imaging device of claim 24, wherein the tracked input to the motor is a PWM signal provided to the motor.

* * * * *